Nov. 11, 1969   R. C. SCHEIDER   3,477,273

SHOCK ABSORBER EVALUATION METHOD

Filed Jan. 29, 1968

ROBERT C. SCHEIDER
INVENTOR

BY John R. Faulkner
William E. Johnson
ATTORNEYS

United States Patent Office 3,477,273
Patented Nov. 11, 1969

3,477,273
SHOCK ABSORBER EVALUATION METHOD
Robert C. Scheider, Toledo, Ohio, assignor to Ford Motor Company, Dearborn, Mich., a corporation of Delaware
Filed Jan. 29, 1968, Ser. No. 701,269
Int. Cl. G01m 17/04; G01k 1/08
U.S. Cl. 73—11                                         11 Claims

ABSTRACT OF THE DISCLOSURE

A nondestructive method of evaluating the quality of a shock absorber has the following steps. A heat sensing probe is attached to the casing of the shock absorber and connected to apparatus which measures a change in an electrical characteristic of the probe which varies with the temperature measured by the probe. The shock absorber is actuated by moving the members interconnected thereby and the movement is terminated after a period of time. The change from an initial value of the electrical characteristic of the probe caused by the temperature increase of the shock absorber is displayed on the measuring apparatus. The quality of the tested shock absorber is classified as a function of the displayed change of the characteristic.

BACKGROUND OF THE INVENTION

Shock absorbers are utilized in the interconnection of many members which are mounted in sprung relationship to one another. The greatest utilization of shock absorbers is in the interconnection formed between the frame and the wheels of a vehicle such as a passenger-carrying motor vehicle. The most common type of shock absorber for such use is a shock absorber wherein a fluid is cycled between chambers and a reservoir in order to dampen oscillations between the wheel and the frame of the vehicle.

The quality of vehicle ride to the passengers in the passenger compartment of a motor vehicle is dependent upon the ability of the shock absorbers of the vehicle to dampen the oscillations between the wheels and the vehicle frame as the wheels pass over bumpy and/or rough roads. As the motor vehicle is utilized over a period of time, the shock absorbers utilized therewith wear out and the resulting vehicle ride becomes rougher for the passengers carried in the passenger compartment. In order to improve the ride characteristics of the vehicle, the shock absorbers must be replaced. New shock absorbers once again give the vehicle the proper dampening action for reducing oscillations between its wheels and frame when the wheels pass over bumpy and/or rough roads.

Many mechanical devices have been developed for testing shock absorbers to evaluate their quality so as to indicate whether they are still suitable for use. In the main these mechanical devices are rather complex and intricate in design and, as a result, they have not found wide acceptance for use by local repair garages and service stations.

The nondestructive method of evaluating the quality of shock absorbers in accordance with the teachings of this invention is simple to perform and utilizes inexpensive and noncomplex equipment to perform the method. The evaluation method can be accomplished in a relatively short period of time and extremely accurate and detailed results as to the quality and future use characteristics of a tested shock absorber are rapidly gained. The shock absorber to be evaluated does not have to be removed from operative association with the members it is interconnecting in order to be tested.

When the method of this invention is utilized to test shock absorbers of a motor vehicle, the owner of the vehicle readily appreciates the quality of the shock absorbers on his vehicle. He is rapidly apprised when the tested shock absorbers are not up to proper quality levels and, therefore, require replacement. The owner of the vehicle also has more confidence in the testing technique because he personally can observe the full testing of the shocks and he can see that the testing is based on scientific principles rather than on the hunches of garage men and mechanics.

SUMMARY OF THE INVENTION

This invention relates to a nondestructive method of evaluating the quality of a shock absorber containing fluid confined in a casing, and more particularly, to a nondestructive method of evaluating both the quality of and the future use characteristics of a shock absorber being utilized in conjunction with a wheel mounted in movable relationship with the frame of a motor vehicle.

In accordance with the teachings of this invention, a heat sensing probe is attached to the casing of the shock absorber to be tested. An electrical characteristic of the heat sensing probe varies with temperature. The attached probe is connected to apparatus which measures a change in the electrical characteristic of the probe. The members interconnected by the shock absorber are moved relative to one another so as to actuate the shock absorber. The shock absorber is actuated for a period of time and the relative movement of the members is then terminated. Any change in the electrical characteristic of the probe occasioned by a temperature rise in the fluid of the tested shock absorber is displayed on the measuring apparatus. The quality of the tested shock absorber is classified as a function of the change in the characteristic displayed on the characteristic measuring device.

More particularly, a low temperature rise in the shock absorber will result in a small change in the electrical characteristic of the probe and a small change in the display characteristic value. Such a small change in the displayed characteristic value will result in the classification of the tested shock absorber as being of poor quality and thus unsatisfactory for further use.

The nondestructive method of evaluating shock absorbers of this invention can be carried out quickly and will provide a highly reliable indication of the quality and future use characteristics of the tested shock absorbers. Also, the method of the invention may be carried out with inexpensive and noncomplex equipment. This permits even the smallest repair garage or service station to employ the shock absorber evaluation method of this invention to aid both in shock absorber sales and in providing customers with better riding characteristics for serviced vehicles.

DESCRIPTION OF THE PREFERRED EMBODIMENT

Construction

The method of this invention is designed to evaluate the quality of shock absorbers of the type which contain fluid. This type of shock absorber dampens vibrations between two members by cycling the fluid of the shock absorber between chambers and a reservoir. The compression of the shock absorber moves the fluid from a chamber in front of the piston to a chamber behind the piston and to the reservoir while the extension of the shock absorber moves the fluid from both the chamber behind the piston and the reservoir to the chamber in front of the piston.

Figure 1:
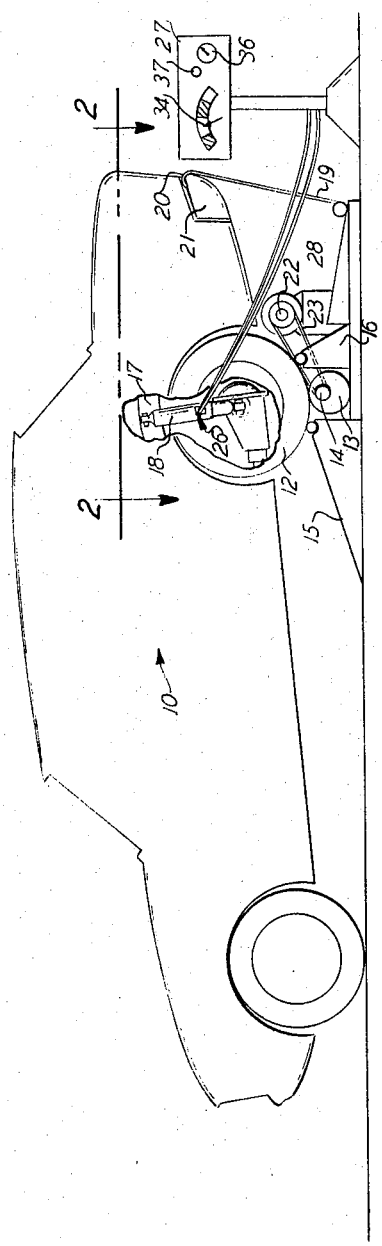
FIGURE 1 is an elevational, schematic representation of a motor vehicle associated with equipment capable of performing the evaluation method of this invention.

As seen best in FIGURE 1, the testing method of this invention is performed on a motor vehicle, generally designated by the numeral 10, at a testing station, generally designated by the numeral 11. As shown in FIGURE 1, the vehicle 10 has both the rear wheels 12 thereof in engagement with identical camming members 13 which are mounted in spaced relationship on a shaft 14. In order to position the wheels 12 of the vehicle in engagement with the camming members 13, the vehicle 10 is backed up inclined ramps 15 at the testing station 11 until the wheels engage stop and positioning members 16.

Each of the rear wheels 12 is mounted in movable relationship to a portion of the frame 17 of the motor vehicle 10 by means of a spring (not shown) and a shock absorber 18. The shock absorber 18 is of the type wherein fluid is confined within the casing of the shock absorber. The shock absorber acts as a device for dampening vibrations between the wheel 12 and the frame 17 of the vehicle 10 when the vehicle traverses bumpy or rough roads.

In order to duplicate rough road conditions, each of the camming members 13 is mounted off its axial center on the shaft 14 such that upon each rotation of the shaft 14 the associated wheel 12 is alternatively driven toward and away from the frame 17 whereby the associated shock absorber 18 is actuated. The motor vehicle 10 may be restrained from oscillatory movements by means such as a restraining strap 19 at the testing station 11. The restraining strap 19 has a hook end 20 which overlies a bumper 21 of the vehicle 10 in order to prevent body movements.

Figure 2:
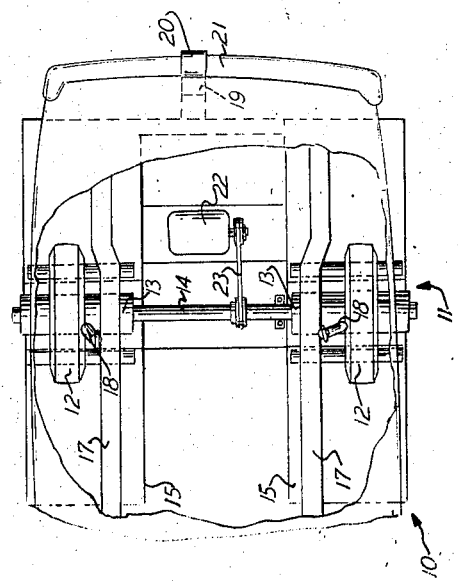
FIGURE 2 is a partial schematic representation of the equipment which may be employed in the evaluation method of this invention and is taken along line 2—2 of FIGURE 1.

As best seen in FIGURE 2, an electric motor 22 drives a pulley 23 which in turn rotates the shaft 14. In one preferred embodiment of the equipment for performing the evaluation method of this invention, the shaft 14 is rotated at 110 revolutions per minute by the motor 22. The camming members 13 are designed to provide, during each rotation thereof, a one inch lift to the wheels 12 between raised and normal positions. Under these conditions, 110 up and down movements are imparted each minute to the wheels 12 and in turn to the associated shock absorbers 18 which are to be evaluated for their quality and future use characteristics.

A heat sensing probe, generally designated by the numeral 26, is attached to the upper casing of each of the shock absorbers 18 to be tested. For the purpose of illustration, only one probe will be described. This probe is connected to an electrical characteristic measuring apparatus 27 by means of electrical leads 28 (best seen in FIGURE 1).

Figure 3:
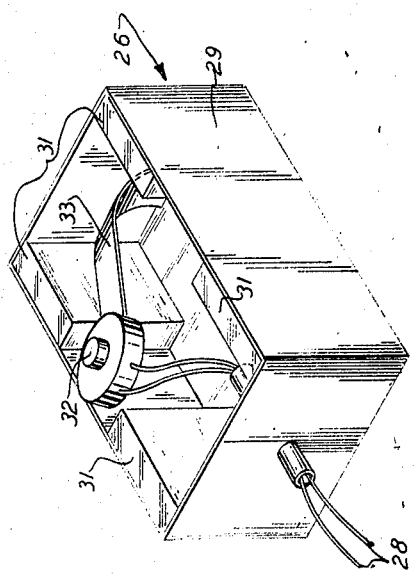
FIGURE 3 is a schematic view of a heat sensing probe utilized as a portion of the invention equipment for performing the method of this invention.

The heat sensing probe 26, in a preferred form, is best seen in FIGURE 3. In this form the probe 26 partially comprises a box-like container 29. In each of the corners of the container 29 there is positioned a magnet 31 for the purpose of securing the probe 26 to the outside of the metal casing of the shock absorber 18. The heat sensitive material 32 of the probe 26 is secured to a spring arm 33 attached, at one end, to a sidewall of the container 29. The heat sensitive material extends above the top of the container so that when the probe 26 is attached to the shock absorber 18, the heat sensitive material 32 will be depressed downwardly into the container and will positively contact the outside casing wall of the shock to be tested. The heat sensitive material 32 of the probe 26 is connected by the electrical leads 28 to the electrical characteristic measuring apparatus 27.

The heat sensitive material 32 of the probe 26 is formed of such a material that an electrical characteristic of the probe will vary with the temperature sensed by the probe. For example, the heat sensitive material 32 may be a thermistor material or may be a nickel alloy material such as is supplied by API Instruments of Chesterland, Ohio. In the two mentioned materials, the electrical resistance of material varies as a known function of the material's temperature.

The electrical characteristic measuring apparatus 27 may be, when the heat sensitive material 32 varies its resistance as a function of temperature, a simple bridge circuit device wherein the change of resistance within one leg of the bridge circuit causes an imbalance between circuit branches. This imbalance is reflected and displayed on the apparatus 27 by the movement of a pointer associated with an indicator dial 34 on the apparatus. The electrical measuring apparatus 27 may be further provided with a zeroing knob 36 so that after the probe 26 is attached to the shock absorber 18 to be tested, the bridge circuit may be brought to a null before the test procedure begins. The null position strikes a balance in the bridge circuit to the temperature which is initially sensed as the temperature of the shock absorber by the probe 26 when first attached to the shock absorber.

Operation

Having described the simple equipment necessary to perform the shock absorber evaluation method of this invention, a full description of the preferred method of this invention will now be given.

In order to initiate an evaluation cycle, the motor vehicle 10 is backed up such that each of the individual rear wheels 12 proceeds up its associated inclined ramp 15 until such time as it engages the stop and positioning member 16 to align that wheel and its associated camming member 13 at the testing station 11. The hook end 20 of the restraining strap 19 is attached to the bumper 21 and the probe 26 is attached by the magnets 31 to the casing of the shock absorber 18 to be tested. The zeroing control knob 36 of the electrical characteristic measuring apparatus 27 is adjusted so that the bridge circuit of the apparatus is brought to a null as reflected by a zero reading on the indicator dial 34.

In accordance with the specific teachings of this invention, the motor 22 is operated so as to rotate the shaft 14 at the rate of 110 revolutions per minute whereby 110 strokes of one inch are imparted per minute by the camming member 13 on the rear wheel 12 whereby the shock absorber 18 associated with that wheel is actuated a similar number of times. The rotation of the shaft 14 is carried out for a period of 45 to 60 seconds, preferably 45 seconds when the rear wheels of the vehicle engage the camming members.

During the actuation of the shock absorber 18, the fluid therewithin is cyclically moved between chambers and the reservoir upon alternate compression and extension cycles of the shock absorber. This working of the fluid, of course, causes a heating thereof as the fluid is passed back and forth between the valving means associated with the individual shock absorber. The heat sensitive material 32 of the probe 26 is heated by the change in temperature of the fluid as it heats the casing of the shock absorber. The material of the probe is heated from the value at which the probe was zeroed. As the material 32 is heated, if formed of the nickel alloy type, the resistance thereof changes and an imbalance occurs in the bridge circuit of the measuring apparatus. This imbalance results in the deflection of the indicator dial 34 whereby a recording is obtained and displayed as to the amount of temperature rise of the shock absorber after the shock absorber has been worked a predetermined amount.

It has been found that the following temperature rises may be expected when the shock absorber is actuated for the period of time specifically set forth above. If the shock absorber 18 is adequate for continued use in the motor vehicle 10, a temperature rise of at least 6° F. is expected during the 45 second actuation of the shock absorber in the evaluation cycle. A temperature rise of approximately 12° F. is obtained from a factory fresh shock absorber, a temperature rise of approximately 12°–18° F. from a replacement shock absorber and a temperature rise between 18° and 24° F. is obtained in the same evaluation period from a shock absorber which may be classified as an extra handling shock absorber such as utilized in the so-called GT type of motor vehicles produced at the present time.

Thus, after actuating the shock absorber 18 by means of the camming member 13 for the prescribed period of time, if the indicator dial 34 on the electrical measuring apparatus 27 does not indicate a temperature rise of approximately 6° F., then the shock absorber 18 may be classified as being defective and the owner of the vehicle may be so informed. The vehicle owner may then replace the shock absorber which is defective and thereby obtain better riding and handling characteristics for his motor vehicle 10.

On the other hand, if the temperature rise within the shock absorber exceeds that desired, 6° F., the owner of the vehicle may be informed that his shock absorber is both adequate and functioning properly. If the vehicle 10 happens to be of the type which has the heavy-duty GT shock absorbers and if the temperature rise indicated is not between 18° and 24° F., then the owner of the motor vehicle may be informed that his GT shock absorbers are no longer rated in the proper category.

The electrical characteristic measuring apparatus may be provided with a suitable switch 37 so that a separate probe 26 may be connected to each of the shock absorbers associated with the rear wheels 12 of the vehicle 10. Thereafter, the probes may be alternately connected to the measuring apparatus 27 whereby a separate reading may be obtained on each of the shock absorbers on the rear of the vehicle during a single evaluation cycle. If a defective shock absorber is replaced as a result of the evaluation cycle, the evaluation cycle may be rerun to show the owner of the vehicle that the replacement shock is all right for service.

In like manner, the shock absorbers associated with the front wheels of the vehicle 10 may also be tested. However, in the case of the front shock absorbers, it has been found that a time period for actuating the shaft 14 and thus for applying a force to the front wheels which causes relative movement thereof with respect to the frame of the vehicle will have to be increased to the neighborhood of 90 seconds. This occurs because of the different manner of suspending the body with respect to the front and rear wheels.

The evaluation cycle for a tested shock absorber may also be terminated prior to the completion of the full time for actuating the wheels. This can be done if the measuring apparatus shows that the shock absorber is of proper quality before the full time period of actuation has passed.

Thus, it may be seen that the method of this invention is predicated on the fact that a temperature rise will occur within a shock absorber after the actuation thereof. If the temperature rise does not fall within predetermined limits, then the shock absorber may be classified as defective. On the other hand, if the shock absorber temperature rise after actuation does fall within prescribed limits, the shock absorber's characteristic may be described as suitable for a normal suspension or as suitable for a GT type suspension.

The method of this invention may be performed rapidly and economically by fairly simple and noncomplex equipment. As such, the method of this invention may be employed by small service station and repair garage attendants and will be an effective means of displaying to the owners of motor vehicles the exact condition of the vehicle's shock absorbers. The method removes from the realm of guesswork the question of whether shock replacement is warranted or whether the shock absorbers associated with a motor vehicle are in proper condition.

What is claimed is:

1. A nondestructive method of evaluating the quality of a shock absorber containing fluid confined in a casing, the shock absorber being utilized in the interconnection of two members, which method comprises the steps of:
    attaching a heat sensing probe to the casing of the shock absorber to be tested, an electrical characteristic of said probe varying with temperature;
    connecting said probe to apparatus which measures and indicates a relative value of the electrical characteristic of said probe, said apparatus giving an indication of the initial value of the characteristic when said probe is initially attached to the shock absorber;
    moving relative to one another the members interconnected by the shock absorber so as to actuate the shock absorber to be tested;
    displaying on said measuring apparatus any change in the electrical characteristic of said probe occasioned by a temperature rise in the fluid of the tested shock absorber; and
    classifying the quality of the tested shock absorber as a function of the change in the measured characteristic displayed on said measuring apparatus.

2. The nondestructive method of evaluating the quality of a shock absorber as defined in claim 1 wherein: said relative movement of said members is terminated after a predetermined time period; and wherein said shock absorber is classified as of acceptable quality if the change in the measured characteristic of said probe displayed on said measuring apparatus exceeds a predetermined limit.

3. The nondestructive method of evaluating the quality of a shock absorber as defined in claim 2 wherein: said relative movement of said members is terminated before said predetermined time period if said change in the measured characteristic displayed on said measuring apparatus exceeds the predetermined limit before the end of said time period.

4. A nondestructive method of evaluating the quality and the future use characteristics of a shock absorber containing fluid confined in a casing, the shock absorber being utilized in conjunction with a wheel mounted in movable relationship with the frame of a vehicle which comprises the steps of:
    positioning the vehicle containing the shock absorber to be tested at a testing station;
    attaching a heat sensing probe to the casing of the shock absorber to be tested, an electrical characteristic of said probe varying with temperature;
    connecting said probe to apparatus which measures and indicates any change in the electrical characteristic of said probe from an initial value of that characteristic when said probe is initially attached to the shock absorber;
    moving relative to one another the vehicle's frame and the wheel so as to actuate the shock absorber to be tested;
    terminating the relative movement of the wheel and vehicle's frame after a predetermined time;
    displaying on said measuring apparatus any change in the electrical characteristic of said probe occasioned by a temperature rise in the fluid of the tested shock absorber; and
    rejecting the tested shock absorber as being of poor quality and unsatisfactory for further use if the change in the displayed characteristic on said measuring apparatus does not exceed at least a predetermined change, which predetermined change is indicative of a predetermined temperature rise in the shock absorber fluid as measured through the casing by said probe.

5. The nondestructive method of evaluating the quality and future use characteristics of a shock absorber as defined in claim 4 wherein said electrical characteristic of said probe is the electrical resistance of said probe.

6. The nondestructive method of evaluating the quality and future use characteristics of a shock absorber as defined in claim 5 wherein when said vehicle is positioned at said testing station, the wheel of the vehicle associated with the shock absorber to be tested is in engagement with a rotatable camming member; and wherein the vehicle's frame and the wheel are moved relative to one another by rotation of the camming member.

7. The nondestructive method of evaluating the quality and future use characteristics of a shock absorber as defined in claim 6 wherein said wheel is a rear wheel of said vehicle; wherein said wheel is actuated at a rate of approximately 110 cycles per minute through a distance of approximately one inch by said camming member; and wherein the relative movement of the wheel and the vehicle's frame is terminated after a 45 to 60 second interval.

8. The nondestructive method of evaluating the quality and future use characteristics of a shock absorber as defined in claim 7 wherein said tested shock absorber is rejected for further use when said change displayed on said measuring apparatus does not indicate a change in the temperature of said shock absorber of at least 6° F.

9. The nondestructive method of evaluating the quality and future use characteristic of a shock absorber as defined in claim 6 wherein said wheel is a front wheel of said vehicle; wherein said wheel is actuated at a rate of approximately 110 cycles per minute through a distance of approximately one inch by said camming member; and wherein the relative movement of the wheel and the vehicle's frame is terminated after a 60 to 90 second interval.

10. The nondestructive method of evaluating the quality and future use characteristics of a shock absorber as defined in claim 9 wherein said tested shock absorber is rejected as being of poor quality and unsatisfactory for further use when said change displayed on said measuring apparatus does not indicate a change in the temperature of said shock absorber of at least 6° F.

11. A nondestructive method of evaluating the quality of a shock absorber containing fluid confined in a casing which comprises the steps of:
    actuating the shock absorber to be tested by applying cyclical compressive and extensive forces thereto so as to force the fluid in the shock absorber between a chamber and a reservoir of the shock absorber; and
    classifying the shock absorber on its ability to provide a dampening medium for an interconnection between two members on the basis of the temperature rise of the fluid within the casing as sensed by the heat rise on the outside surface of the casing.

References Cited

UNITED STATES PATENTS

| | | | |
|---|---|---|---|
| 1,984,635 | 12/1934 | Dysart et al. | 73—11 |
| 2,059,856 | 11/1936 | Eastman et al. | 73—10 XR |
| 2,344,331 | 3/1944 | Swift et al. | |
| 3,030,796 | 4/1962 | MacMillan | 73—11 |
| 3,045,471 | 7/1962 | Chapman et al. | 73—10 |
| 3,187,554 | 6/1965 | Lackman | 73—11 |
| 3,383,909 | 5/1968 | Percy | 73—11 XR |

CHARLES A. RUEHL, Primary Examiner

U.S. Cl. X.R.

73—344